United States Patent [19]

Rogen

[11] 4,114,559

[45] Sep. 19, 1978

[54] TEMPERATURE MONITORING

[75] Inventor: Neil E. Rogen, Upper Saddle River, N.J.

[73] Assignee: Nicoa Corporation, Waltham, Mass.

[21] Appl. No.: 608,505

[22] Filed: Aug. 28, 1975

Related U.S. Application Data

[63] Continuation-in-part of Ser. No. 508,224, Sep. 23, 1974, abandoned.

[51] Int. Cl.² .................................................. G01K 11/00
[52] U.S. Cl. .................................. 116/114.5; 73/339 R; 73/343 R; 73/343 B; 73/378.3
[58] Field of Search .................. 116/114.5, 114 R; 73/343 R, 378.3, 339 R, 343 B; 337/140, 141

[56] References Cited

U.S. PATENT DOCUMENTS

| | | | |
|---|---|---|---|
| 3,291,617 | 12/1966 | Barker | 73/378.3 |
| 3,440,997 | 4/1969 | Rogen | 73/378.3 |
| 3,483,748 | 12/1969 | Rogen | 73/378.3 |
| 3,483,752 | 12/1969 | Rogen | 73/378.3 |
| 3,516,082 | 6/1970 | Cooper | 337/140 |
| 3,594,675 | 7/1971 | Willson | 337/140 |
| 3,652,969 | 3/1972 | Willson | 337/140 |
| 3,731,247 | 5/1973 | Levinn | 337/140 |

Primary Examiner—S. Clement Swisher
Assistant Examiner—Denis E. Corr
Attorney, Agent, or Firm—Jerry Cohen

[57] ABSTRACT

Temperature of a blood bag or other refrigerated package is continuously monitored throughout long periods of low temperature transportation and/or storage by an attached button. If the package contents exceed the predetermined safe upper temperature limit, the button produces an indication of having exceeded such limit sometime during transportation and/or storage. The indication is provided by a visual marker mounted on a metal part having a phase transition temperature corresponding to said limit and formed above the safe temperature to have a position which holds the indicator in a visible position corresponding to excessive temperature. The wire is shaped to a second position at freezing temperatures below said safe temperature by means which provide a visual indication of such setting.

11 Claims, 9 Drawing Figures

1

TEMPERATURE MONITORING

CROSS REFERENCE TO RELATED APPLICATIONS.

This application is a continuation-in-part of application Ser. No. 508,224 filed Sept. 23, 1974, and now abandoned.

BACKGROUND OF THE INVENTION

The present invention relates to temperature monitoring of blood bags and other packaged frozen materials which must be transported and/or stored, all the while maintaining their respective contents below a predetermined upper temperature limit. The present invention provides an inexpensive, discardable temperature monitoring unit which may be dedicated to an individual package, but which reliably provides an indication of excessive temperature history if it occurs.

Temperature monitoring of blood bags and the like is described in detail in my U.S. Pat. Nos. 3,483,752 and 3,440,997.

It is an important object of the present invention to provide inexpensive temperature monitoring of refrigerated materials.

It is a further object of the invention to provide reliable temperature monitoring consistent with the preceding object.

It is a further object of the invention to provide non-invasive temperature monitoring consistent with one or both of the preceding objects.

It is a further object of the invention to provide a temperature monitoring device which can be dedicated to a particular package to be monitored consistent with one or more of the preceding objects.

It is a further object of the invention that the device be settable in a manner that is apparent to any operator consistent with one or more of the preceding objects.

It is a further object of the invention that the device provide an indication of setting, distinguishable from indication of temperature excess consistent with one or more of the preceding objects.

It is a further object of the invention that the indications be visual and quite obvious consistent with one or more of the preceding objects.

SUMMARY OF THE INVENTION

The objects of the invention are achieved through provision of an inexpensive temperature monitoring button dedicated to each package to be monitored. The button is adhered to a package wall and the contacting walls of the button and package are sufficiently thermal conducting in relation to other walls thereof so that the interior of the button is primarily sensitive to the temperature of package contents rather than ambient temperatures. The button comprises fixed and movable subassemblies arranged to work a temperature sensitive metal carrier therebetween. The carrier carries an indicator element on the moving subassembly. For instance, the carrier may be a metal wire and its indicator element may be a colored bead carried on the wire and a corresponding indicator element of the moving subassembly may be a window. Alternatively, these indicator elements may be electrical contact points forming part of an electrical circuit for activating an alarm or other indicating output when contact is made between the points.

The metal carrier comprises material having a phase transition temperature corresponding to a predetermined upper temperature limit for the package contents to be monitored during transportation and/or storage. Nickel, iron and cobalt when alloyed with titanium exhibit configuration memory capabilities when worked above such a transition temperature such that they can be further worked below such a transition temperature and upon raising their temperature to the transition temperature level, they will make a distinct spontaneous movement to the first work configuration. A preferred alloy for purposes of the present invention is nickel-titanium in approximately equal atomic percentages. However, other alloys may be employed. Also, elements having an allotropic transformation temperature corresponding to a desired limit for a particular frozen package storage and/or transportation applications may be employed.

Other quasi-elastic materials may be employed in lieu of the preferred equiatomic nickel titanium alloys. Such alternative materials include copper-zinc binary alloys and copper-zinc - X ternary alloys described by Pops et al in 1964 in A.I.M.E. Transactions, Vol. 230, p. 1662, in 1966 in A.I.M.E. Transactions, Vol. 236, p. 1532, and in 1970 in Metallurgical Transactions, Vol. 1, p. 251 or copper — alluminum — nickel alloys, described by Rachinger in 1960 at Vol. 5, p. 114 of the Journal of the Australian Institute of Metals, all of which have martensitic formation temperatures below room temperature. For blood monitoring at higher temperatures, a substantively wider range of effective materials is available, including gold — cadmium, indium — thallium nickel aluminide, elemental cobalt or titanium or zirconium and in the further binary alloys, iron — nickel, copper aluminum and cobalt — nickel.

The mechanism of martensitic shear, also known as diffusionless transformation, and the reversability of the same are not entirely understood in the art, but are commonly understood to include atomic movement between adjacent planes of atoms through less than a full interatomic distance (based on normal atomic lattice spacings). Such movement is possible because below the "transition temperature range of" other particular material, certain localized electron bonds are broken. Raising temperature above the transition temperature range causes the formation of strong, energetic and directional electron bonds that pull the displaced atoms back to their predeformed positions. The nature of the movement of atoms is essentially a slipping of atomic planes — comparable to what would happen to an aligned deck of playing cards if a shearing force were applied, i.e., each card sliding slightly out of alignment with its immediate neighboring card.

On a gross mechanical level, such materials exhibit a shape memory effect. That is, they can be plastically deformed while exposed to a temperature below the transition temperature range and subsequently, upon exposure to a temperature within the temperature transition temperature range, they will automatically revert to the original configuration. Such gross effects arise from the above discussed planar slipping due to shear forces and more particularly in an acicular martensitic phase produced by the plastic deformation. The acicularity is removed by heating into or above the transition temperature range and, again on a gross mechanical level, the material will be seen to reverse the deformation to an extent determined by the degree of temperature rise.

Practical limits of alloy formation make it desirable to provide a tolerance for variance and transition from production run to production run. It is a particular feature of the present invention that the temperature monitoring device may be tailored to the response of the metal carrier.

The temperature monitoring device moving assembly further comprises a locking element which holds the metal carrier to avoid a false reading of temperature excess. The locking element and other portions of the moving subassembly are so interrelated to provide visual indication that the metallic carrier has been worked and set for monitoring, with such indication being completely unambiguous and being held before and after a temperature rise which restores the metallic carrier from its second to first worked position. This avoids the possibility that failure to set the temperature monitor will be equated with a history of temperature excess.

In accordance with a further feature of the invention, the carrier and means for working it from first to second configurations can be so arranged to minimize strain induced in the course of martensitic transformation of the wire when working from the first configuration to the second configuration. This allows reliable linear response.

It is preferably accomplished by moving a support at one end of the carrier wire while the free end bears against a reaction member via a floating intermediate reaction member which can be snapped out of the way when the deformation of the carrier is accomplished. Such an arrangement minimizes parts and simplifies apparatus construction and calibration.

Numerous other objects, features and advantages of the invention will be apparent from the following detailed description of the preferred embodiments of the invention, taken in connection with the accompanying drawing, in which:

DETAILED DESCRIPTION OF PREFERRED EMBODIMENTS

Figure 1:
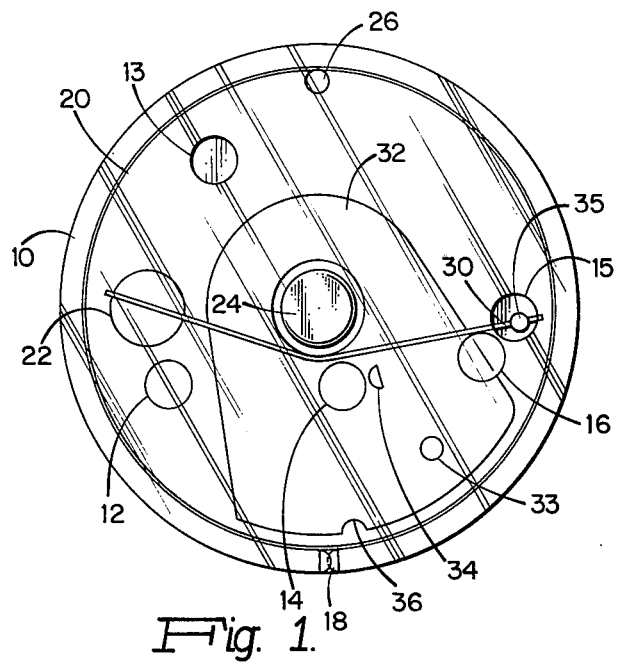
FIGS. 1-3 are sectional top views of a temperature monitor device portion of a blood bag equipped in accordance with a first embodiment of the invention in three different positions of operation with a fourth position corresponding to visual indication of excess temperature being indicated in chain lines in FIG. 3.
Figure 2:
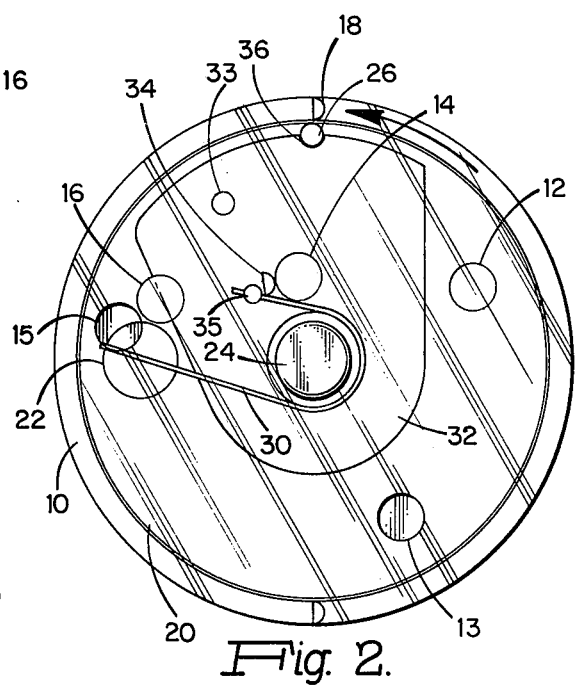
Figure 3:
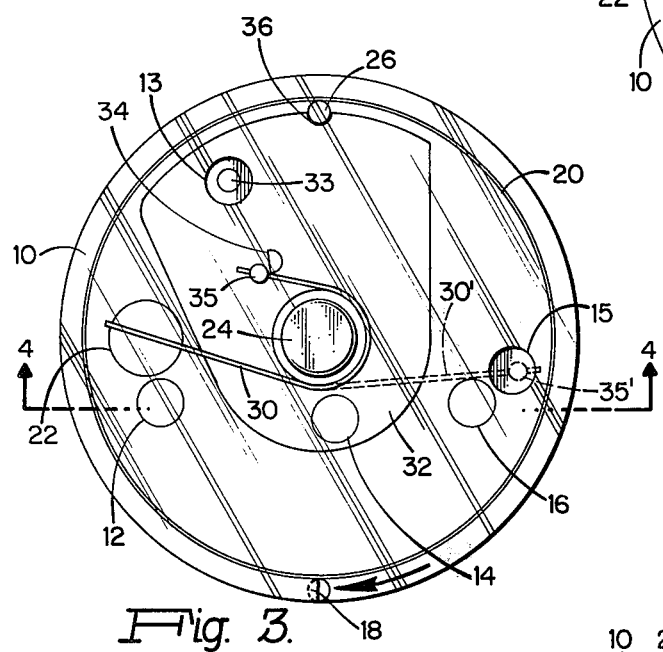

Referring to FIGS. 1-4 together, the temperature monitoring device of a first embodiment of the invention comprises a movable subassembly of parts 10-18 and 30-36 working together with a fixed subassembly comprising parts 20-28 which comprises a fixed reaction member. The major parts of these subassemblies are movable disc 10 and a fixed disc 20 which define two opposing walls of a device package. The fixed wall 20 may be adhered to the wall of the blood bag or other package for refrigerated material and the movable wall 10 is visible to an observer. The movable wall 10 has raised islands 12, 14, 16 and 18 (islands 12, 14 and 16 being indicated by right hand section) which are movable therwith and also comprises transparent window portions 13 and 15 which are also movable therewith. The fixed wall 20 comprises raised islands 22, 24 and 26 indicated with left hand sectioning and which remain fixed therewith. The movable subassembly further comprises an alloy wire 3 which has an end secured in fixed island 22, the opposite end being free and having an intermediate portion bendable around island 24. The movable subassembly further comprises a cam 32 mounted on island 24 and pivotable about said island and having itself, a raised section 34 which is engageable with island 14 of movable wall 10 to drive the cam counter clockwise when the wall 10 is rotated counter clockwise about island 24 which serves as a pivot therefor. The cam 32 further comprises a cutout 36 which is engageable with fixed island 26 to lock cam 32 as shown in FIGS. 2 and 3. A visual indicator of positioning history is provided by a colored dot (e.g., blue) 33 mounted on cam 32 and another colored bead (e.g., red) 35 mounted on wire 30.

Figure 4:
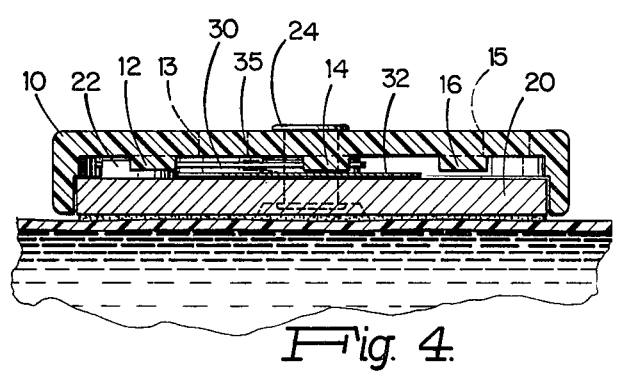
FIG. 4 is a cross-sectional view of the FIGS. 1-3 embodiment taken as indicated by the arrows 4—4 in FIG. 3.

A portion of a blood bag is indicated at B in FIG. 4 and fixed wall 20 may be adhesively bonded to the blood bag wall or otherwise secured thereto in well bonded, thermally conducting relation.

OPERATION OF FIGS. 1-4 EMBODIMENT

After setting the blood bag into cold storage, the parts of the temperature monitoring device has the relative positioning shown in FIG. 1. The operator grasping the periphery of wall 10 rotates wall 10 and its attached parts 12, 13, 14, 15, 16 and 18, counterclockwise and thereby drives cam 32 and wire 30 to the positions shown in FIG. 2. The device is then set by slot 36 of cam 32 engaging locking island 26. The operator then rotates wall 10 back clockwise to establish the positioning of parts shown in solid lines in FIGS. 3-4 (ignoring the chain line configuration 30'). Window 13 is then aligned with dot 33 to show that the temperature monitor has been set and window 15 is then prepared to receive bead 35 if the preset temperature is exceeded. Cam 32 is locked in its upper position. If during the course of transport and/or storage, the critical temperature is exceeded, wire 30 will uncurl to the position shown on 30' putting head 35 in the position shown at 35' within the window 15. It can then be determined from inspection at the end of the transportation and/or storage period that excessive temperature occurred at some time during such period.

Figure 5:
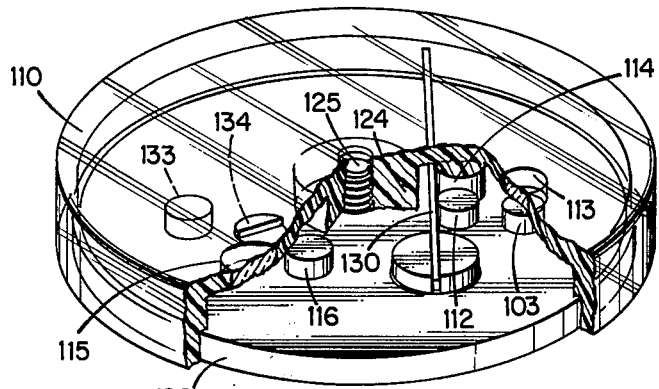
FIGS. 5-6 are sectional top views of a monitor device portion in accordance with a second embodiment of the invention.
Figure 6:
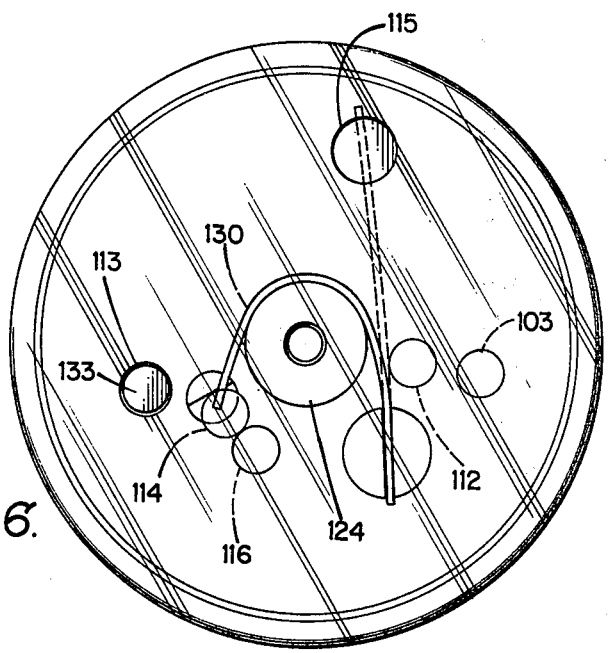

Referring now to FIGS. 5-6 a second embodiment of the invention, incorporating a different temperature sensing and indicating module, is illustrated. The module comprises a flat base disc 120 adhered or otherwise bonded to the item to be monitored, a rotatable upper disc 110 (a rim portion and lands of which are shown in the sectional views of FIGS. 5 and 6), a wire 130 and a screw 125 with its threads engaged in a central land portion 124 of part 110 and its head bearing on the under side of disc 120 to hold the module together. Alternatively, the discs may be held together by a rivet.

Fixed disc 120 has islands 103 and 133 thereon to serve as first and second location markers, islands 112 and 116 as first and second stops, island 122 as a wire support and a ramp guide 134. Movable disc 110 has downwardly extending islands 114 to serve as a wire pusher and has first and second windows 113 and 115.

The windows are, preferably transparent circles in an opaque background of disc 110.

The initial position of parts is as drawn in FIG. 5 and the temperature monitoring position is established by a 180° counterclockwise twist to the FIG. 6 position without a return twist.

In the FIG. 5 position, window 113 exposes marker 103 and the end of wire 130 is not visible through any window. Upon setting the device for monitoring (FIG. 6) window 115 exposes market 133, wire 130 is wrapped around the island 124 and is not visible, and window 115 is at the original site of the free end of wire 130. If the transition of temperature of wire 130 is exceeded, its free end will snap to window 115 to provide a visual indication of overtemperature.

In the course of movement from its FIG. 5 to FIG. 6 positions, island 114 pushes wire 130 until island 114 rides over cam 134 to get clear of wire 130 and leave it free to expand back to window 115.

Stops 112 and 116 provide limits to movement of pusher 114, and accordingly limit movement of disc portion 110 as a whole.

Figures 7, 8:
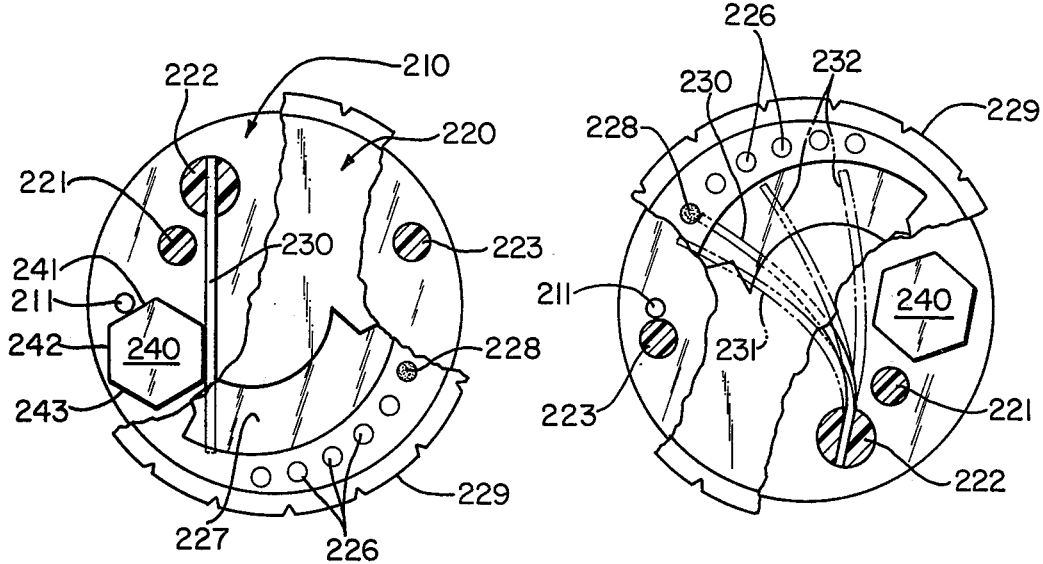
FIGS. 7, 7A and 8 are sectional top views of the monitor device portion in accordance with a third embodiment of the invention, in three operating positions.
Figure 7A:
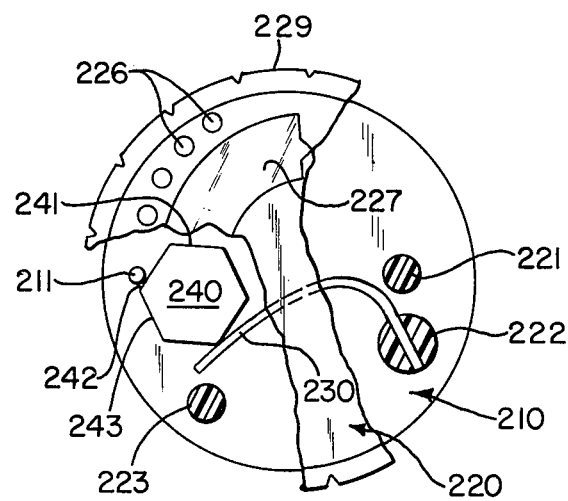

A further preferred embodiment of the invention is now described in connection with FIGS. 7, 7A and 8 showing, respectively, unset and set positions of the apparatus with setting and over-temperature indicating positions of the wire indicated in phantom in FIG. 8.

The embodiment and equivalents are characterized by minimizing strain induced in the martensitic transformation wire in the course of working from the first configuration to the second configuration to allow reliable linear response and is further characterized by a minimum of parts for simplicity and economy and comprises a first subassembly (disc) 210 which is bonded to the article whose thermal history is to be monitored and the second movable subassembly (upper disc) 220 with knurled or otherwise graspable sidewalls indicated at 229 and a face label 228 containing a window 227 and a temperature indicia 226. A fixed post 211 which serves as a fixed reaction member is mounted on subassembly 210 and the wire 230 is mounted from a supporting post 222 carried on movable subassembly 220. The movable subassembly comprises a stop post 223 which engages fixed post 211 to limit rotation of 210 in the clockwise direction and a post 221 for aligning parts in production of the device.

The movable subassembly 220 comprises indicia of temperature 226 thereon including a linear degree scale which can be calibrated for each production run of thermal monitoring devices. A floating reaction member 240 is placed between wire 230 and fixed reaction member 211 and preferably comprises a polygonal disc preferably a hexagon as indicated at 240. The post 221 helps to properly position member 240 in the device as initially manufactured.

The operation of the embodiment can now be described. The movable subassembly 220 is rotated clockwise from the rest position shown in FIG. 7 and carries support 222 clockwise so that the unsupported free end of wire 230 is bent by reaction of fixed member 211, via floating member 240, to form it (the wire 230) into a bow shape, as shown in FIG. 7A. In the course of such bow shape formation, the intermediate reaction member 240 moves through what is formed as an increasing and then decreasing spacing between fixed reaction member 211 and the free end of wire 230 by sequential sliding of faces 241, then 242, then 243 along reaction member 211. This effects an initial deflection of wire 230 to the position shown in FIG. 7A and in phantom (FIG. 8) at 231 and then if and when exposed to temperature rise relaxation to the position of wire 230 shown in solid in FIG. 8 or other. If the temperature of the device to be monitored and of the temperature monitoring assembly rises above the transition temperature of the wire material, it deflects (i.e., its free end deflects) to one of the positions indicating in phantom (FIG. 8) at 232, or therebetween, depending on the amount of temperature rise and the scale 226 can be utilized to indicate the extent of temperature rise because of the linear nature of the deflection.

It will be noted from FIGS. 7A and 8 that the floating reaction member has no room to move back to a point below fixed pin 211 even if movable subassembly 220 is rotated back counterclockwise; i.e., the temperature monitoring device cannot be reset and a permanent record of overtemperature exposure, if any, of contents monitored thereby is maintained.

Since the extent, as well as the fact of, temperature rise can be measured, it becomes possible to reconsider rejection of many marginal items and to salvage many more items which might have been exposed to a modest temperature excursion. It also becomes possible to save on refrigeration costs by imposing more modest refrigeration requirements, given this greater degree of control.

While the floating reaction member 240 is shown as a hexagon, in FIGS. 7-8, it will be appreciated that it can be made of other polygonal forms or even of circular or cammed curving forms. Further, the floating reaction members 240 could be integrated with wire 240 as a cammed extension thereof, or alternatively, the cammed extension could be provided on fixed reaction member 211. Relative movement of wire 230 with respect to reaction member 211 can be achieved by many means other than relative rotation of two opposing discs, including, for instance, a flexible roof which would allow direct manipulation of wire 230. The length of martensitic transformation material can be in ribbon or other elongated forms other than a straight wire shown in FIGS. 1-8.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Temperature monitoring device indicating thermal history comprising, means defining opposing first and second relatively fixed and movable subassemblies, respectively, means defining a material having a first configuration above a transition temperature which is formable into a second configuration below said temperature and having the capability of changing sharply from said second configuration to said first configuration at the transition temperature, said material being connected between said first and second subassemblies for working from said first configuration to said second configuration by relative movement of said subassemblies, means defining an indicator of working said material from said first to said second configuration and means for locking said indicator in position, and means defining an indicator of return of said material from its second configuration to its first configuration if the transition temperature is reached, and wherein the fixed subassembly is bondable to an item whose thermal history is to be monitored and comprises fixed position markers therein and said movable subassembly comprises window means alignable with said markers to constitute said indicator of working said material.

2. Temperature monitoring device indicating thermal history comprising, means defining first and second fixed and movable respectively, subassemblies, means defining a material having a first configuration above a transition temperature which is formable into a second configuration below said temperature and having the capability of changing sharply from said second configuration to said first configuration at the transition temperature, said material being connected between said first and second subassemblies for working from said first configuration to said second configuration by relative movement of said subassemblies, means defining an indicator of working said material from said first to said second configuration and means for locking said indicator in position, means defining an indicator of return of said material from its second configuration to its first configuration if the transition temperature is reached, and wherein the fixed subassembly comprises a reaction member for effecting said working of material as the subassemblies are relatively moved.

3. Temperature monitoring device indicating thermal history comprising, means defining first and second fixed and movable respectively, subassemblies, means defining a material having a first configuration above a transition temperature which is formable into a second configuration below said temperature and having the capability of changing sharply from said second configuration to said first configuration at the transition temperature, said material being connected between said first and second subassemblies for working from said first configuration to said second configuration by relative movement of said subassemblies, means defining an indicator of working said material from first to said second configuration and means for locking said indicator in position, means defining an indicator of return of said material from its second configuration to its first configuration if the transition temperature is reached, and wherein the movable subassembly comprises window means for receiving said material when it returns to its first configuration.

4. Temperature monitoring device indicating thermal history comprising, means defining first and second fixed and movable respectively, subassemblies, means defining a material having a first configuration above a transition temperature which is formable into a second configuration below said temperature and having the capability of changing sharply from said second configuration to said first configuration at the transition temperature, said material being connected between said first and second subassemblies for working from said first configuration to said second configuration by relative movement of said subassemblies, means defining an indicator of working said material from said first to said second configuration and means for locking said indicator in position, means defining an indicator return of said material from its second configuration to its first configuration if the transition temperature is reached, and wherein the fixed subassembly is bondable to an item whose thermal history is to be monitored and comprises fixed position markers therein and said movable subassembly comprises window means alignable with said markers to constitute said indicator of working said material, wherein the movable subassembly comprises a reaction member and the movable subassembly comprises a pusher member for effecting said working of material as the subassemblies are relatively moved, and wherein the fixed subassembly comprises window means for receiving the material when it returns to its first configuration.

5. Temperature monitoring device indicating thermal history comprising, means defining first and second fixed and movable respectively, subassemblies, means defining a material having a first configuration above a transition temperature which is formable into a second configuration below said temperature and having the capability of changing sharply from said second configuration to said first configuration at the transition temperature, said material being connected between said first and second subassemblies for working from said first configuration to said second configuration by relative movement of said subassemblies, means defining an indicator of working said material from said first to said second configuration and means for locking said indicator in position, means defining an indicator of return of said material from its second configuration to its first configuration if the transition temperature is reached, and and wherein the material working and material return are carried out essentially in a common plane of rotation.

6. Temperature monitoring device in accordance with claim 5 wherein the material is in wire form, is cantilever mounted and is worked by the relative rotation of opposing dishform discs comprising said first and second subassemblies applying working forces through intermediate pushing means, the subassemblies containing a visible scale constituting said indicating means and relatively positioning said material and scale in a preset arrangement by said relative movement therewith, the temperature indicating change from said second to first configurations being made solely through temperature induced phase change within the material and without application of external driving force thereto.

7. Temperature monitoring device for indicating thermal history comprising, means defining a material in elongated form having a first configuration above a transition temperature which is formable into a second configuration below said temperature and having the capability of changing from said second configuration to said first configuration at temperatures equal to and greater than the transition temperature in a linear relationship of movement to sensed temperature change over at least a span of 5° C., means for bowing a length of said material from said first configuration into a relatively bowed position constituting said second configuration in a bow curve extending over half the length of said material and comprising a radius of curvature greater than half the length of said material, said bowing means comprising a manually movable end support for said length of material and a fixed reaction member located in relation to the unsupported end of said material so that the bow curve formed by said material in said second configuration will be convex towards said fixed reaction member, means defining a floating intermediate reaction member located between said unsupported end of material length and said fixed reaction member.

8. Temperature monitoring device in accordance with claim 7 wherein said floating reaction member comprises a polygonal disc.

9. Temperature monitoring device in accordance with claim 8 wherein said intermediate reaction member comprises a hexagon.

10. Temperature monitoring device in accordance with claim 8 and further comprising a first sub-assembly which is bondable to an item whose thermal history is to be monitored, a second subassembly which forms an enclosure together with said first subassembly and which is manually manipulatable relative to said first subassembly, one of said subassemblies mounting said fixed reaction member and the other of said subassemblies mounting said length of material.

11. Temperature monitoring device for indicating thermal history comprising, means defining a wire of martensitic transformation material supported at one free end, manually manipulatable means for pressing the unsupported wire end so that the wire bows and then locking the bowed wire against manual restoration so that straightening of the bow can only be accomplished by thermal cycling of the free end of the bowed wire, the bow having a radius of curvature of greater than half the wire length to minimize strains of bow formation working so that movement of the free end of the bowed wire in response to thermal cycling is essentially linear over a temperature range of at least 5° C.

* * * * *